United States Patent
Hallerback

[11] 3,735,462
[45] May 29, 1973

[54] METHODS FOR THE MANUFACTURE OF BEARING SUPPORTS FOR ELECTRIC ROTARY MACHINES

[76] Inventor: Stig Lennart Hallerback, 12, Blodbaksjatan, Vastra Frolunda, Sweden

[22] Filed: Nov. 1, 1971

[21] Appl. No.: 194,140

[30] Foreign Application Priority Data
Nov. 2, 1970 Sweden..............................14728/70

[52] U.S. Cl. ............................................29/148.4 R
[51] Int. Cl. .............................B21h 1/12, B21k 1/04
[58] Field of Search .................29/148.4 A, 148.4 R, 29/149.5 R, 149.5 N, 149.5 M

[56] References Cited
UNITED STATES PATENTS

| | | | |
|---|---|---|---|
| 2,952,897 | 9/1960 | Glavan | 29/148.4 A |
| 3,213,518 | 10/1965 | Saito | 29/148.4 A |
| 3,249,986 | 5/1966 | Adkins | 29/148.4 A |

Primary Examiner—Thomas H. Eager
Attorney—Dexter N. Shaw, Charles H. Howson, Jr., John W. Logan et al.

[57] ABSTRACT

A method for precision manufacture of bearing supports for electric rotary machines such as electric motors, said bearing supports comprising a cup-shaped member the larger end of which forms a mounting portion for being secured in a permanent way, such as by bonding, to a stator end face inside the stator end windings, and the smaller end of which provides location for rotor bearing means, consisting of the steps of pressing sheet metal to form the support by multi-stage transfer pressing in continuous working stages, forming the larger end of the bearing support in one stage to provide an abutment surface parallel to a plane at substantially right angles to a rotor bearing-locating surface of generally cylindrical form in the smaller hub-like end of the bearing support, forming in another stage a generally cylindrical surface concentric with the rotor bearing-locating surface and forming in still another stage at least one bonding surface dependent of said surfaces determining dimensional and geometrical accuracy.

8 Claims, 4 Drawing Figures

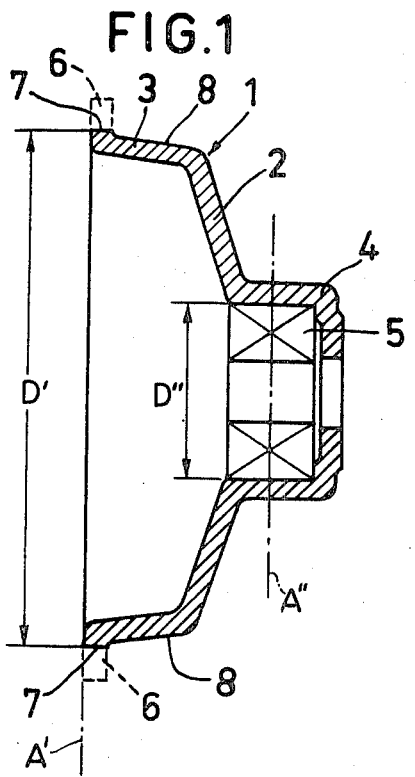
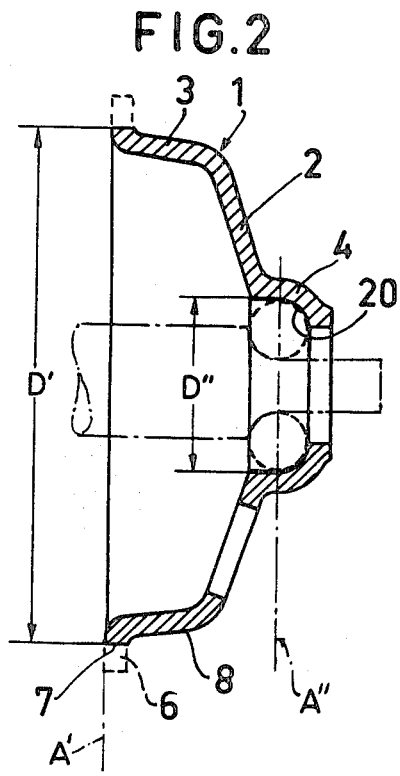
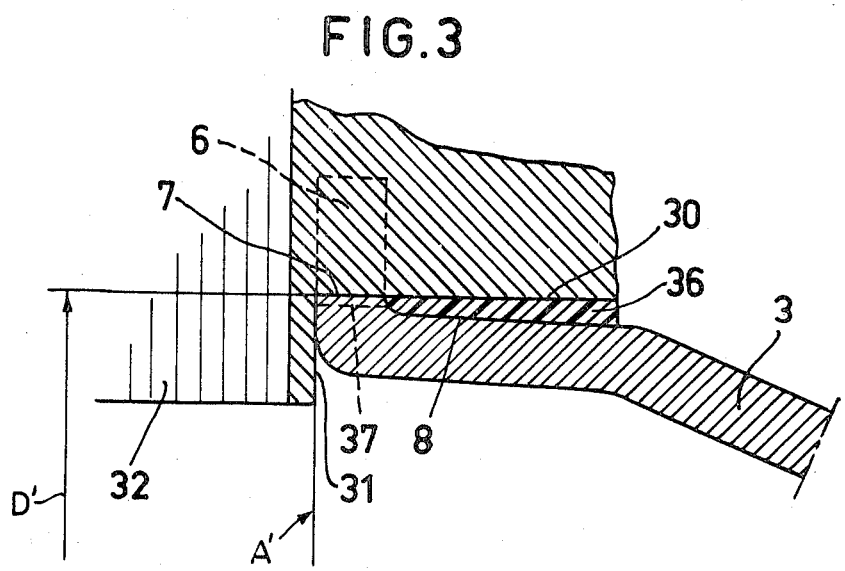

METHODS FOR THE MANUFACTURE OF BEARING SUPPORTS FOR ELECTRIC ROTARY MACHINES

The present invention relates to a method for precision manufacture of bearing supports for use in electric motors and other electric rotary machines, such a bearing support comprising a cup-like member shaped at its larger end for attachment in a permanent way to the stator end face radially inside the stator end windings, preferably by means of moulding, bonding, or a similar method, and providing at its smaller end location for rotor bearing means.

A rigid, coaxial and aligned mounting of bearing supports relative to each other as well as relative to the stator bore is of essential importance in electric rotary machines. An accurate alignment of the rotor relative to the stator bore and an optimal air gap between rotor and stator is conducive to attaining high efficiency, small heat losses and silent and smooth running of a motor. Even as slight eccentricities as a few microns may have a perceptible negative influence on the performance and silent running of the motor. For this reason there are high demands on alignment and abutment surfaces of the stator employed for locating the bearing supports. There are also exacting demands on the design and manufacture of the bearing support, since there must be concentricity between a radially locating alignment surface and the central portion accomodating the bearing and further parallelity between an axial abutment surface and a radial plane of the rotor bearing. Furthermore, there must exist an accurate dimensional relationship between the locating surfaces of different bearing supports, to attain an accurate positioning relative to the aligning and abutment parts of the stator in continuous line production. It is also necessary to provide structural rigidness in the bearing support for attaining a perfect journalling of the rotor.

The mounting of the bearing support to the stator also affects the design of the bearing support. Even a thin coating of glue or resin on mating surfaces may be enough to effect adversely the geometrical precision of mounting. This may entail reduced motor performance. By that reason a locating surface should not be employed for the purpose of securing the bearing support to the stator. Some other surface has to be provided for that purpose.

The attachment to the stator end face radially inside the end windings of bearing supports such as referred to above offers several advantages with regard to design and operation. However, on account of the minimal space at the end faces of the stator between the inside of the end windings and the rotor, normally not exceeding 1–2 millimetres in the radial direction for small motor sizes, the mounting portion of the bearing support must be of very small dimensions. The necessary accurate machining of the locating surfaces will consequently be of a most exacting nature.

When the bearing support is secured to the stator in a non-detachable manner, as by means of moulding, bonding, or the like, a low production cost is of special importance, since a faulty motor is generally scrapped.

For the conventional manufacture of bearing supports as practiced hitherto, die-castings or pressings are produced which are machined in conventional machines to obtain concentric alignment surfaces and accurately radial abutment portions. This often does not produce the desired standard of exactness in the assembled structure, since for cost reasons it is not feasible to carry out such finishing to the desired degree of accuracy other than in very special cases. Thus the manufacture of bearing supports by sheet metal pressing, for use in electric motors, is restricted to such fields where demands on precision are modest. Higher demands on the quality of engineering must be met through finishing the pressed bearing support by cutting methods with ensuing high costs, or else measures must be resorted to which compensate somewhat a low standard of precision, such as employing self-adjusting bearings.

A method for the precision manufacture of bearing supports of the type referred to is provided by the invention. This manufacture is advantageously performed by means of continuous multi-stage transfer pressing, preferably in an automatic multi-stage press, which renders additional machining unnecessary. Alternatively, the manufacture can be performed with a combination tool, in which punching, drawing and pressing operations are performed according to a schedule, resulting in a completed bearing support. The working steps required for the manufacture of the bearing support may be so many, however, that tools of the combination type do not suffice. In the following description of the manufacturing process provided by the invention reference is therefore made to automatic multi-stage transfer pressing, which should not be understood in a restrictive sense. Such pressing as well as presses and tools for its execution are well-known in the art and need not be specifically described. The basic material for this manufacture can be comparatively cheap sheet-metal plates or strips of ferrous or non-ferrous material. The pressing method makes it possible to obtain great precision. Multi-stage transfer pressing does not easily allow of the same freedom to form with precision each alignment or locating surface independently to the high standard of accuracy required, as does for example machining by means of turning. Pressing the different alignment or locating surfaces of the bearing support, which surfaces are substantially at right angles to each other, as well as the mounting surface or surfaces, therefore requires special consideration when designing the axial abutment surfaces as well as the bonding surfaces and surfaces of coaxial alignment. According to the invention all these surfaces are directed and arranged in such a way that the desired result will be achieved.

By forming locating surfaces and bonding surfaces by means of pressing as proposed according to the invention it will be possible to provide bearing supports which will meet the requirements as to dimensional and geometrical accuracy within very close tolerances. Furthermore, the radially locating surfaces and the necessary bonding surface, which is separated from said radially locating surfaces, can be formed in merely two or even one pressing stage with the necessary dimensional precision. A considerable improvement of the characteristics of the material can be obtained by plastic forming of the material in one pressing stage. The desired rigidity of the bearing support can be obtained by pressing the body portion of the bearing support into frusto-conical shape, which also facilitates the subsequent operations in an automatic multi-stage press. The improved pressing method also makes it possible to reproduce the dimensions in long line production to an extent which is practically impossible when machining by turning and/or grinding, or in die-casting. This, of course, is an important cost-reducing factor.

Hereinafter there will follow a description of the manufacture of bearing supports by the method according to the invention, to meet the requirements as to the quality of engineering that have been set forth above.

In the drawing,

FIG. 1 is a longitudinal section view of a bearing support manufactured as by pressing.

FIG. 2 is a similar section view of a second embodiment, and

FIG. 3 is a fragmentary section on a larger scale of bearing baring support and its mounting at the stator.

Figure 4:
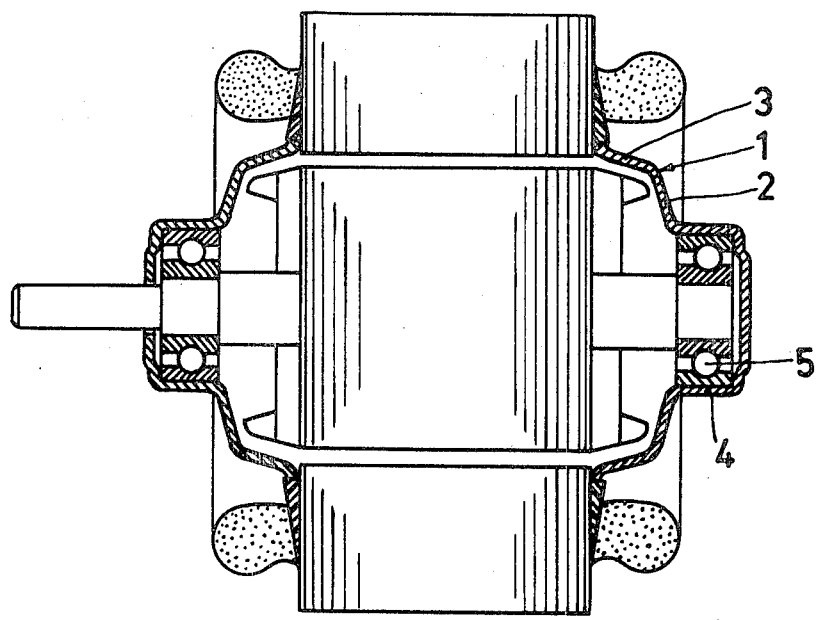
FIG. 4 is a longitudinal section view of an electric motor provided with bearing supports similar to those illustrated in FIGS. 1 to 3.

FIG. 1 illustrates a cup-shaped bearing support 1 comprising a frusto-conical body portion 2 and a larger end portion 3 for attaching to the stator end face, radially inside the stator end windings of an electric motor, while the smaller, hub-like end portion 4 of the bearing support is shaped so as to provide a housing for a bearing 5. The bearing support is formed at its end portion 3 with an abutment face A', which is parallel to a radial plane A'' of the hub-like portion. The attachment portion 3 is moreover formed with an aligning surface D', which is concentric with the cylindrical surface D'' of the hub-like portion forming a seating for the bearing 5. The angular position of the radial surface A'' is normally determined by this guiding surface D''.

In order to obtain parallellism and concentricity between axially and radially locating surfaces, pressing is effected in such a way that a circular blank is punched out of a sheet-metal strip in the first operation stage, whereafter the basic shape of the bearing support is formed in one or more steps, at which procedure a radial flange portion 6 is formed at the larger end 3 of the bearing support. This flange cannot be formed with a satisfactory roundness or concentricity in the pressing stage, and accordingly cannot be used as the surface D' without finishing. By firstly providing the bearing support with the flange 6, an axial abutment face A' can be obtained, which is necessary to attain parallelism with the radial surface A'' of the hub-like portion. This is followed in the next stage by a punching operation for trimming off flange 6. The punching tool may engage the hub-like portion 4 in that operation to make the rim 7 with the diameter D' concentric with the inner periphery D'' of the hub-like portion 4. With the indicated sequence of operations it is further feasible to form the bearing support with the necessary surface of attachment 8 separated from the radially and axially locating surfaces, without the need for any extra stage of operation.

FIG. 2 illustrates a second embodiment of a cup-shaped bearing support 1 made of sheet metal with material characteristics suitable for rolling bearings. In this instance the possibilities of the pressing method are exploited further by forming in one of the working stages the hub-like portion 4 in such a way that it forms at the inside a bearing track 20. This bearing track need not in all cases be subjected to a finishing operation after the pressing operation. However, further machining may be preferable, especially when there are high demands on the bearing. The bearing track has a radial plane, indicated by A'' and parallel with the abutment surface A' formed at the larger end of the bearing support in the same stage as the flange 6, required for the final forming of the bearing support. Axial and radial locating surfaces as well as the mounting surface 8 are formed in the same way as described with reference to FIG. 1. Through the application of a pressing method using tools for multi-stage transfer pressing and in continuous operation steps, it is possible for bearing track and locating and attaching surfaces to be formed with precision in such a way that the forming of one surface does not impair in any way the precision of the forming of any other surface.

FIG. 3 illustrates more in detail a section of a bearing support, the mounting portion 3 of which is bonded to a stator 32 having a cylindrical radially locating surface 30 and a plane axial abutment surface 31. The mounting portion 3 of the bearing support has been formed with a flange 6 during the operation in the press, as described with reference to FIG. 1. This flange subsequently has been trimmed by punching, thus forming the surface 7 with the diameter D'. This surface is concentric with the inner periphery D'' of the hub-like portion at the small end of the bearing support (FIGS. 1 or 2). Through the forming of flange 6 the abutment surface A' is obtained, which is parallel with the radial plane A'' of the hub-like portion 4 (FIGS. 1 or 2). When the bearing support is mounted so as to engage closely the surfaces 30 and 31, respectively, the bonding with glue or other bonding compound 36 is restricted to the separate bonding area 8, thus preventing glue or bonding substance from penetrating in between the mating surfaces affecting the accuracy of the assembly, as this might spoil the precision.

FIG.3 shows, furthermore, that the bearing support during the punching operation for trimming the flange 6 has been formed with axial grooves 37. Thus, the bearing support is prevented from changing its angular position, the glue or bonding substance filling out these grooves and forming keys counteracting any torsional displacement.

FIG.4 illustrates an electric motor provided with bearing supports 1 fixed to the stator end faces radially inside the stator end windings. These bearing supports are of the general type described above and illustrated in the drawings.

What I claim is:

1. A method for precision manufacture of bearing supports for electric rotary machines such as electric motors, said bearing supports comprising a cup-shaped member the larger end of which forms a mounting portion for being secured in a permanent way, such as by bonding, to a stator end face inside the stator end windings, and the smaller end of which provides location for rotor bearing means, consisting of the steps of pressing sheet metal to form the support by multi-stage transfer pressing in continuous working stages, forming the larger end of the bearing support in one stage to provide an abutment surface parallel to a plane at substantially right angles to a rotor bearing-locating surface of generally cylindrical form in the smaller hub-like end of the bearing support, forming in another stage a generally cylindrical surface concentric with the rotor bearing-locating surface and forming in still another stage at least one bonding surface dependent of said surfaces determining dimensional and geometrical accuracy.

2. A method as claimed in claim 1 including forming in one working stage a radial flange at the larger end of the bearing support, and in a subsequent stage trimming said flange at its periphery to form a cylindrical surface coaxial with the bearing-locating cylindrical surface of the bearing support.

3. A method as claimed in claim 1 including forming ridge and groove bonding portions in cylindrical alignment surface at the large end of the bearing support to increase the torsional resistance of the bearing support when fixed to a stator.

4. A method as claimed in claim 3 wherein the ridge and groove bonding portions are formed in a working step simultaneously with the forming of the abutment surface.

5. A method as claimed in claim 3 wherein the ridge and groove bonding portions are formed in a working step simultaneously with the cylindrical alignment surface.

6. A method as claimed in claim 1 including the step of impressing within the hublike smaller end portion of the bearing support a bearing track of a rolling bearing, the plane of which is parallel to the abutment surface.

7. A method as claimed in claim 6 wherein said impressing operation is done in one working step concurrently with forming the abutment surface.

8. A method as claimed in claim 6 wherein said impressing operation is done in one working step concurrently with forming the cylindrical alignment surface.

* * * * *